(12) United States Patent
Nonoshita et al.

(10) Patent No.: US 9,359,042 B2
(45) Date of Patent: Jun. 7, 2016

(54) BICYCLE CRANK ASSEMBLY

(71) Applicant: Shimano Inc., Sakai, Osaka (JP)

(72) Inventors: Tetsu Nonoshita, Osaka (JP); Masahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 219 days.

(21) Appl. No.: 14/061,033

(22) Filed: Oct. 23, 2013

(65) Prior Publication Data

US 2014/0047947 A1    Feb. 20, 2014

Related U.S. Application Data

(63) Continuation of application No. 12/858,858, filed on Aug. 18, 2010, now Pat. No. 8,616,085.

(51) Int. Cl.
   *B62M 3/00*    (2006.01)
(52) U.S. Cl.
   CPC ................. *B62M 3/00* (2013.01); *B62M 3/003* (2013.01); *Y10T 74/2164* (2015.01); *Y10T 74/2165* (2015.01)
(58) Field of Classification Search
   CPC .. Y10T 74/2164; Y10T 74/2167; B62M 3/00; B62M 3/003; B62M 3/04; B62M 1/36
   See application file for complete search history.

(56) References Cited

U.S. PATENT DOCUMENTS

| | | | | |
|---|---|---|---|---|
| 2,350,468 | A | * 6/1944 | Kraeft | B62M 3/00 74/594.1 |
| 3,922,929 | A | * 12/1975 | Marchello | B62M 3/02 74/562 |
| 4,303,149 | A | 12/1981 | Lech, Jr. | |
| 5,609,070 | A | * 3/1997 | Lin | B62M 3/16 74/558.5 |
| 5,819,599 | A | * 10/1998 | Yamanaka | B25B 13/48 74/594.1 |
| 5,893,299 | A | * 4/1999 | Yamanaka | B62M 3/00 74/594.1 |
| 7,530,290 | B2 | 5/2009 | Lin | |
| 2004/0200314 | A1 | 10/2004 | Hermansen et al. | |
| 2006/0101940 | A1* | 5/2006 | Okada | B62J 23/00 74/594.1 |
| 2006/0236808 | A1 | 10/2006 | Bonner | |
| 2007/0241530 | A1* | 10/2007 | Nonoshita | B62M 3/00 280/259 |
| 2007/0283781 | A1 | 12/2007 | Meggiolan | |
| 2008/0164673 | A1 | 7/2008 | Lane et al. | |
| 2008/0247695 | A1* | 10/2008 | Yamanaka | F16C 3/08 384/458 |
| 2009/0165947 | A1* | 7/2009 | Iwasawa | B29C 65/5035 156/295 |

FOREIGN PATENT DOCUMENTS

| | | |
|---|---|---|
| CN | 2277928 Y | 4/1998 |
| EP | 1120336 A2 | 8/2001 |
| EP | 1712462 A1 | 10/2006 |
| WO | 03/000543 A1 | 1/2003 |

\* cited by examiner

*Primary Examiner* — Daniel Yabut
(74) *Attorney, Agent, or Firm* — Global IP Counselors (57) ABSTRACT

A bicycle crank assembly is provided with a crank arm that includes a first outer shell, a second outer shell, and a pedal attachment structure. The first outer shell is a one-piece, pressed sheet metal member with the projecting part being a bent portion that defines the first pedal axle opening. The first outer shell has a projecting part projecting from the first outer shell in an axial direction. The first and second outer shells are adhesively attached together to form an interior cavity. The pedal attachment structure includes an abutment face with a recess formed in the abutment face such that the abutment face contacts the first outer shell adjacent the first pedal axle opening and the projecting part of the first outer shell is disposed in the recess of the pedal attachment structure.

14 Claims, 10 Drawing Sheets

BICYCLE CRANK ASSEMBLY

CROSS-REFERENCE TO RELATED APPLICATIONS

This application is a continuation application of U.S. patent application Ser. No. 12/858,858, filed on Aug. 18, 2010. The entire disclosure of U.S. patent application Ser. No. 12/858,858 is hereby incorporated herein by reference.

BACKGROUND

1. Field of the Invention

This invention generally relates to a bicycle crank assembly. More specifically, the present invention relates to a composite bicycle crank assembly.

2. Background Information

A bicycle crank arm is a component for connecting a pedal to a crank. axle, and for transmitting a pedal force from the pedal to a chain. The crank arm should have high strength in order to prevent damage or deformation despite the crank arm being repeatedly subjected to loads from the pedal, and high rigidity in order to prevent deformation or flexing when the pedal is depressed. The crank arm is preferably also designed to be as lightweight as possible in order to reduce the weight of the entire bicycle. In the past, many front crank sets often used solid crank arms that were forged metal members. These solid crank arms can be quite heavy depending on the material. In more recent years, these solid crank arms have been made from lighter weight metal alloys and/or have been constructed as hollow areas and/or recesses in order to reduce weight (e.g., see, U.S. Pat. No. 6,058,803 and U.S. Pat. No. 6,145,184). In addition, more recently, crank arms have been made with one or more portions made of a hard plastic material or a fiber reinforced resin material in order to reduce weight (e.g., see, U.S. Pat. No. 7,527,277).

SUMMARY

One aspect of the present disclosure is to provide a bicycle crank assembly that is relatively lightweight, yet with sufficient strength.

In accordance with another aspect of the present disclosure, a bicycle crank assembly is provided that basically comprises a crank arm that includes a first outer shell, a second outer shell, and a pedal attachment structure. The first outer shell has a first pedal attachment end with a first pedal axle opening and a projecting part projecting from the first outer shell in an axial direction with respect to the first pedal axle opening. The first outer shell is a one-piece, pressed sheet metal member with the projecting part being a bent portion that defines the first pedal axle opening. The second outer shell has a second pedal attachment end with a second pedal axle opening that is axially aligned with the first pedal axle opening. The first and second outer shells are adhesively attached together to form an interior cavity therebetween. The pedal attachment structure spans the interior cavity between first and second pedal attachment ends of the first and second outer shells. The pedal attachment structure includes a pedal axle bore axially aligned with the first and second pedal axle openings. The pedal attachment structure further includes an abutment face with a recess formed in the abutment face such that the abutment face contacts the first outer shell adjacent the first pedal axle opening and the projecting part of the first outer shell is disposed in the recess of the pedal attachment structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
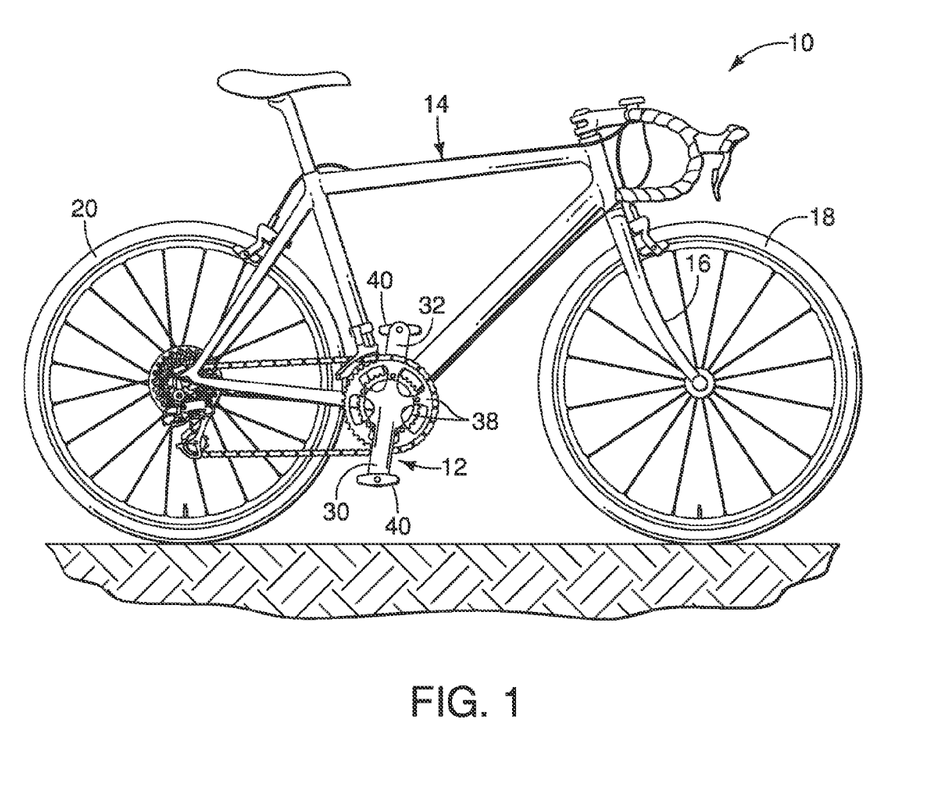
FIG. 1 is a side elevational view of a bicycle equipped with a bicycle crank assembly in accordance with one illustrated embodiment.

Referring initially to FIG. 1, a bicycle 10 is illustrated that is equipped with a bicycle crank assembly 12 in accordance with a first embodiment. The bicycle 10 has a diamond-shaped frame 14 with a front fork 16 pivotally coupled thereto. The crank assembly 12 is mounted to the frame 14 in a conventional manner as explained below. A front wheel 18 is mounted to the front fork 16, while a rear wheel 20 is mounted to the rear end of the frame 14. As seen in FIG. 1, the bicycle 10 is a "road racer" (racing style road bike) that has a diamond-shaped frame 14 that serves as the framework of the bicycle. However, the bicycle crank assembly 12 can be used with other types of bicycles.

Figure 2:
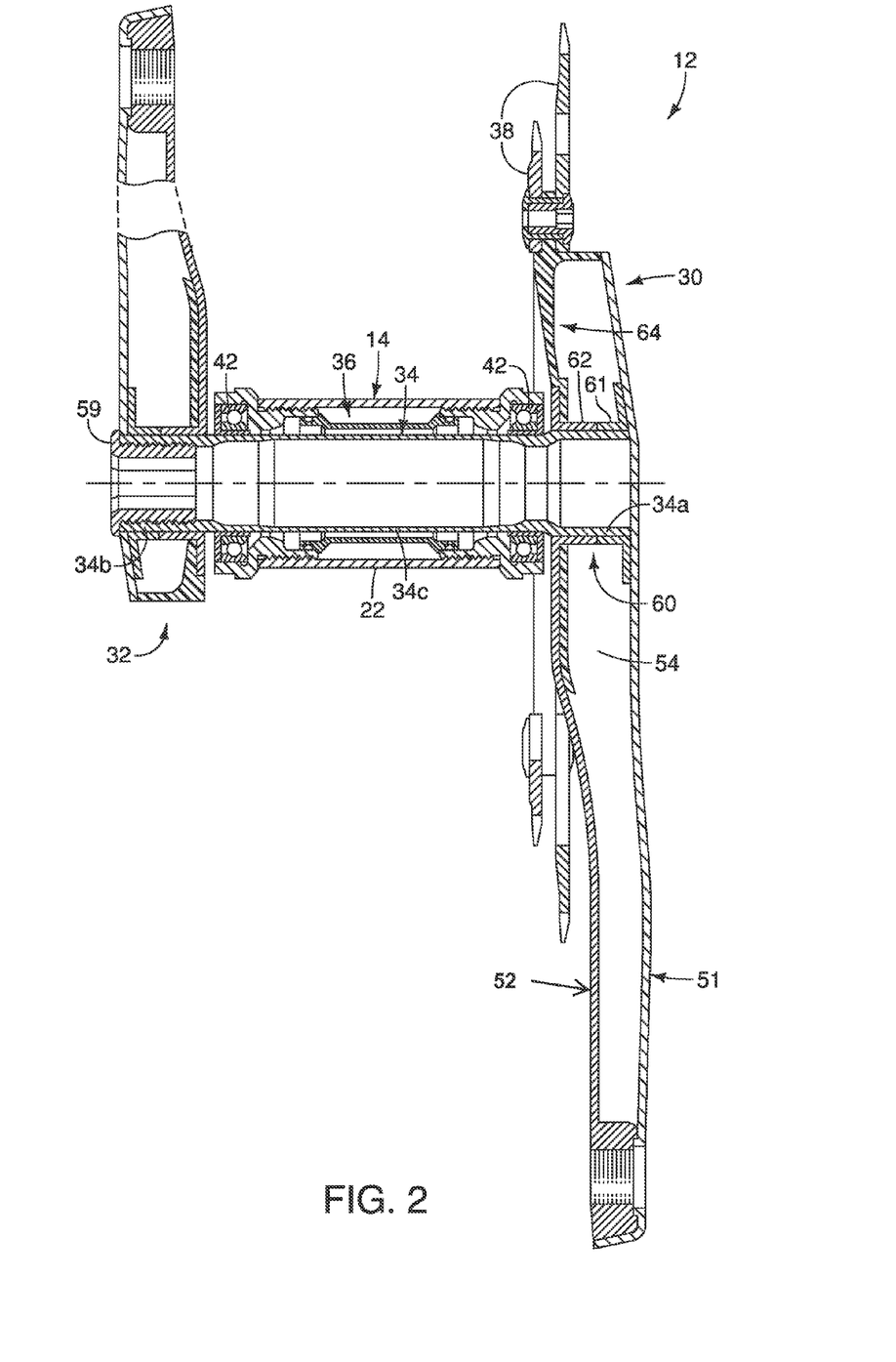
FIG. 2 is a transverse cross sectional view of the bicycle crank assembly in accordance with the illustrated embodiment.
Figure 3:
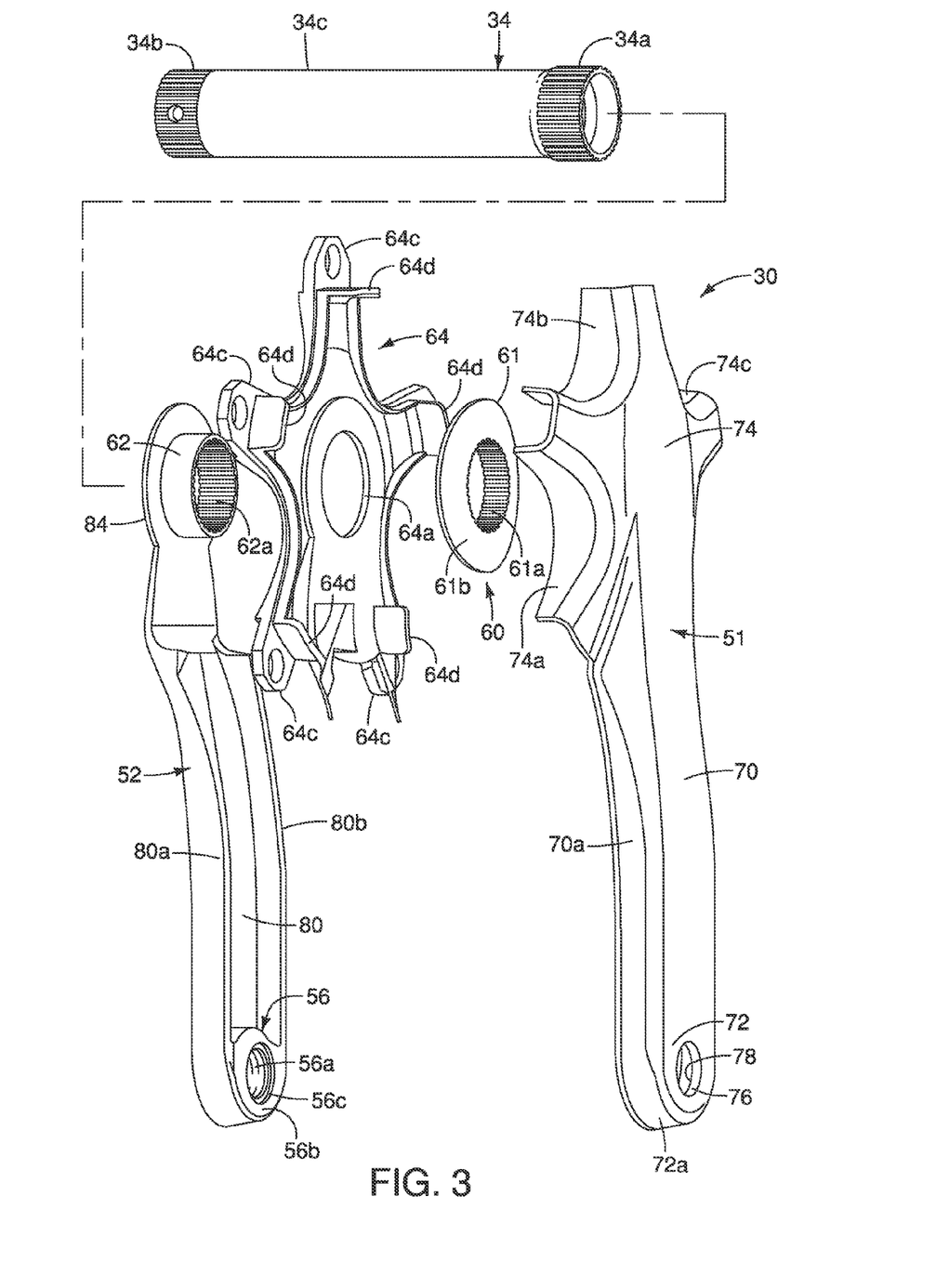
FIG. 3 is an outside exploded perspective view of the right crank arm and the crank axle of the bicycle crank assembly illustrated in FIG. 2.

Referring now to FIGS. 2 and 3, the bicycle crank assembly 12 will now be discussed in more detail. Basically, the crank assembly 12 is supported on a. bottom bracket shell 22 of the frame 14. The bottom bracket shell 22 is formed at the intersection of a seat tube, a down tube and a rear chain stays of the frame 14. The bicycle crank assembly 12 basically includes a right crank arm 30, a left crank arm 32 and a crank axle 34. The crank axle 34 is rotatably supported to the bottom bracket shell 22 by a bottom bracket structure 36 in a conventional manner. In the illustrated embodiment, the bicycle crank assembly 12 further includes a pair of chainrings 38 mounted to the right crank arm 30. As seen in FIG. 1, pedals 40 are mounted to the free end of each of the crank arms 30 and 32 so the rider can rotate the crank arms 30 and 32. to propel the bicycle 10 in a conventional manner.

Figure 4:
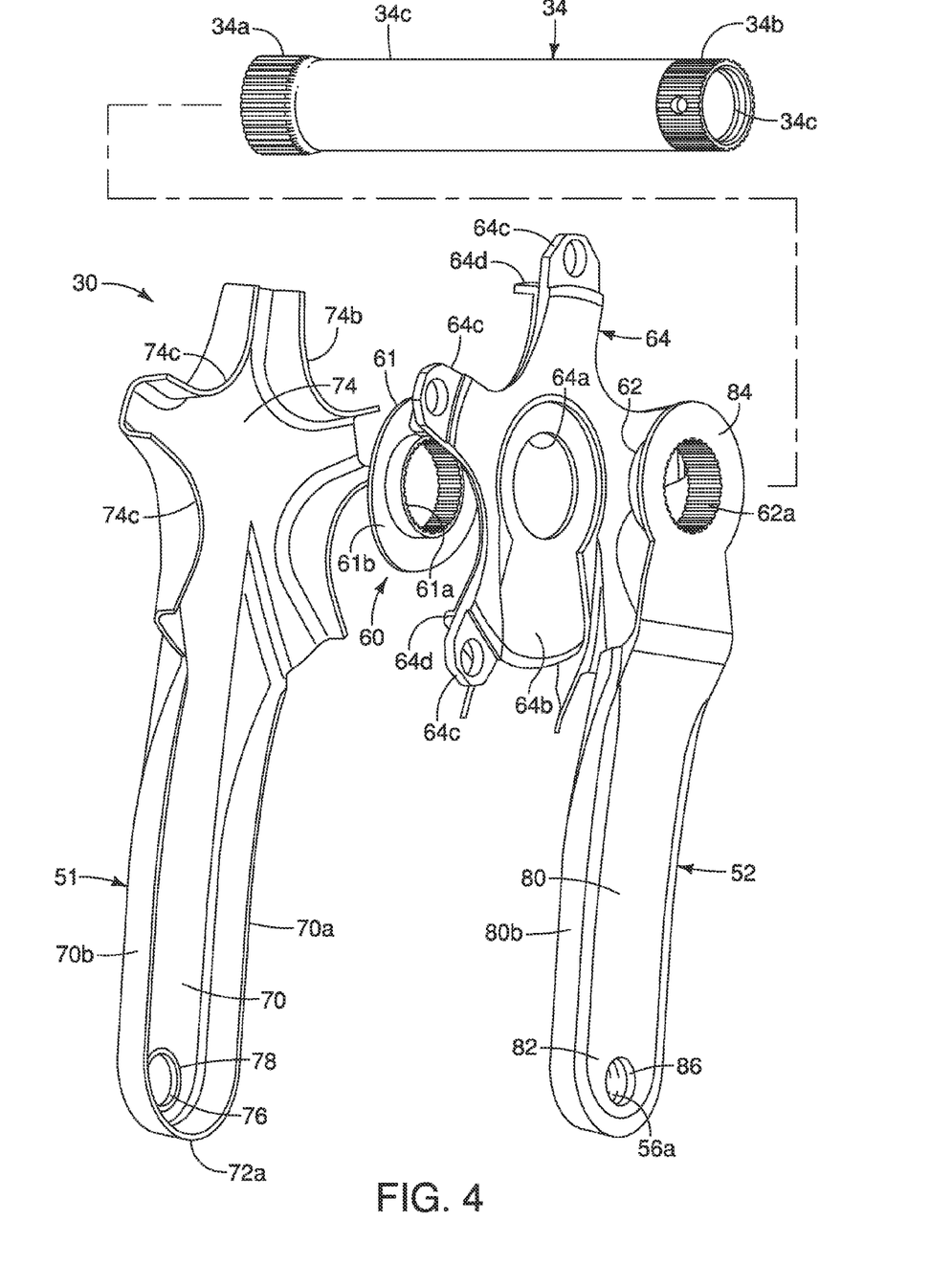
FIG. 4 is an inside exploded perspective view of the right crank arm and the crank axle of the bicycle crank assembly illustrated in FIGS. 2 and 3.
Figure 5:
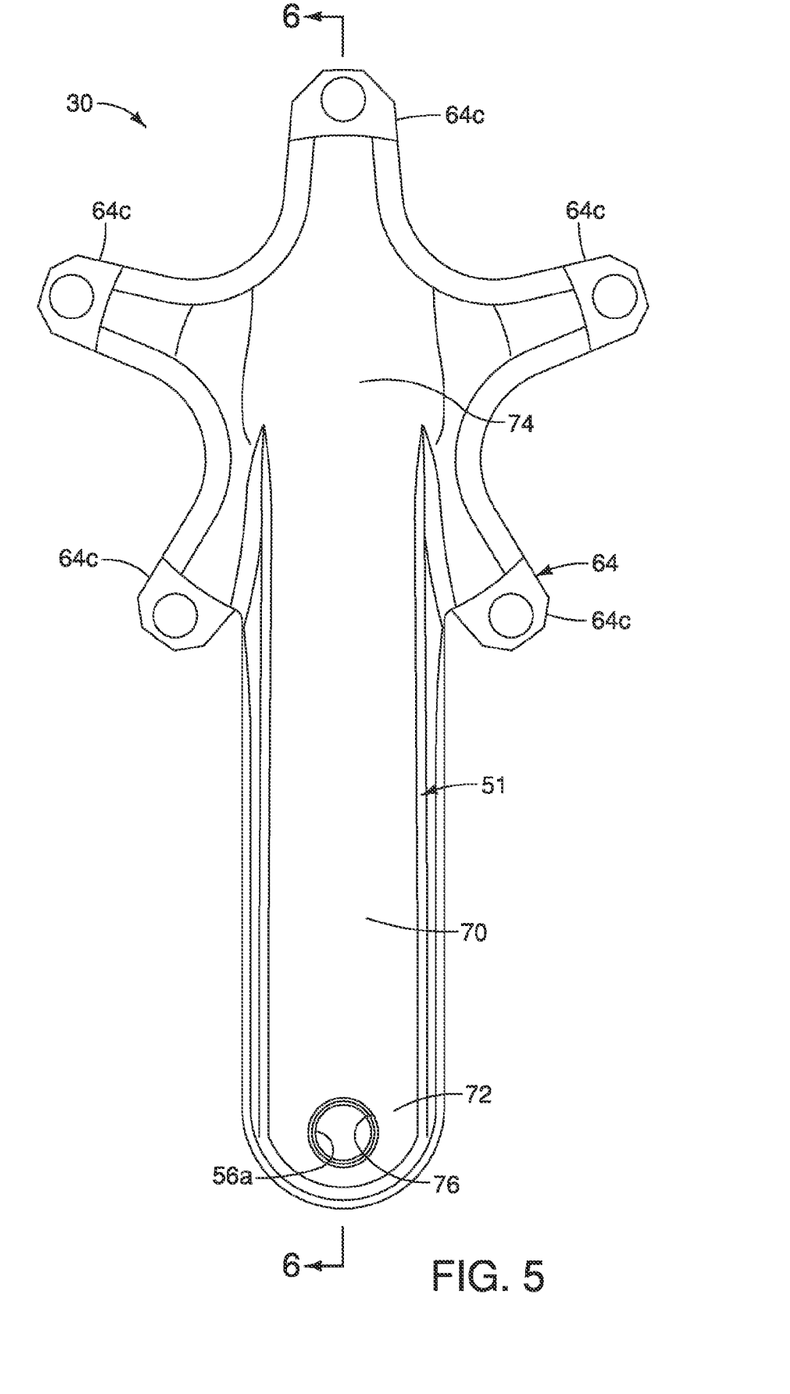
FIG. 5 is an enlarged side elevational view of the right bicycle crank arm illustrated in FIGS. 1 to 4.

The crank arms 30 and 32 are non-rotatably mounted to opposite ends of the crank axle 34. As shown in FIGS. 2 to 4, the crank axle 34 is preferably a hollow pipe-shaped member made of chrome-molybdenum steel or another such highly rigid alloy, for example. As shown in FIG. 2, the right end of the crank axle 34 is fixed to the right crank arm 30 by press-fitting and/or an adhesive, for example. In the illustrated embodiment, the adhesive can be any suitable adhesive such as an epoxy type adhesive. The crank axle 34 includes a plurality of axially extending first splines 34a disposed at a first (right) end portion of the crank axle 34, and a plurality of axially extending second splines 34b disposed at a second (left) end portion of the crank axle 34. In this embodiment, the first splines 34a are configured and arranged to extend radially outward from an outer peripheral surface 34c of the crank axle 34, and the second splines 34b are configured and arranged not to protrude radially outward relative to the outer peripheral surface 34c of the crank axle 34. The second splines 34b may be tapered splines or non-tapered splines. The crank axle 34 is attached to the axle supporting structure 60 of the right crank arm 30 as discussed below. Also, as seen in FIG. 4, the crank axle 34 has an internal thread 34c. The internal thread 34c is formed in the internal peripheral surface at the left end of the crank axle 34 for threadedly fastening the axle bolt 59 to retain the left crank arm 32 on the left end of the crank axle 34, as shown in FIG. 2.

The bottom bracket structure 36 is a multi-part assembly that includes, among other parts, a pair of bearings 42 disposed in bearing housings that are threaded into the ends of the bottom bracket shell 22. Basically, the bottom bracket structure 36 is mounted in the bottom bracket shell 26 of the frame 18 in a conventional manner. Also the crankshaft 34 is rotatably supported by the bearings 42 of bottom bracket structure 36 within the bottom bracket shell 26 in a conventional manner. The bearings 49 are ball bearings or other roll bearings having inner rings and outer rings.

The bottom bracket structure 36 is mounted on the bottom bracket shell 22 with the crank axle 34 is rotatably supported in the cylindrical bottom bracket shell 22 of the frame body 12 by the bottom bracket structure 36. The right crank arm 30 is integrally fixed to the right end of the crank axle 34 by a loose-fit or press-fit connection with one of the pedals 40 (FIG. 1) mounted on the distal end. The left crank arm 32 is detachably fixed to the left end of the crank axle 34 with the other of the pedals 40 (FIG. 1) mounted on the distal end.

As best seen in FIGS. 2 to 4, in this illustrated embodiment, the right crank arm 30 basically includes a first outer shell 51 and a second outer shell 52. The first and second outer shells 51 and 52 are fixedly secured together to at least partially define an interior cavity 54, which can be empty or filled with a lightweight material (e.g., foam). In this illustrated embodiment, the first and second outer shells 51 and 52 are adhesively attached together to form the interior cavity 54 therebetween. In the illustrated embodiment, the adhesive can be any suitable adhesive. For example, an epoxy type adhesive can be used to fix the first and second outer shells 51 and 52 together. The first outer shell 51 forms the external surface of the crank arm 30, while the second outer shell 52 forms the inner surface of the crank arm 30.

In this illustrated embodiment, as seen in FIGS. 2 to 4, the right crank arm 30 further includes a pedal attachment structure 56 and an axle supporting structure 60. The pedal attachment structure 56 is configured and arranged for securing one of the pedals 40 thereto. The axle supporting structure 60 is disposed in an interior cavity 54 between the first and second outer shells 51 and 52. The axle supporting structure 60 is configured and arranged for attaching the crank axle 34 to the right crank arm 30. Preferably, the crank axle 34 can be attached to the crank arm 30 by adhesive. In the illustrated embodiment, the adhesive can be any suitable adhesive such as an epoxy adhesive. In this illustrated embodiment, the axle supporting structure 60 includes a first axle supporting member 61 and a second axle supporting member 62. The first axle supporting member 61 is attached to the first outer shell 51. The second axle supporting member 62 is attached to the second outer shell 52.

In this illustrated embodiment, as seen in FIGS. 2 to 4, the right crank arm 30 further includes a sprocket mounting member 64. The sprocket mounting member 64 is configured and arranged for attaching the chainrings 38 to the right crank arm 30. In this illustrated embodiment, the sprocket mounting member 64 is adhesively attached to the first and second outer shells 51 and 52. In the illustrated embodiment, the adhesive can be any suitable adhesive. For example, an epoxy type adhesive epoxy type adhesive can be used to fix the sprocket mounting member 64 to the first and second outer shells 51 and 52 together.

Referring now to FIGS. 3 to 6, the structure of the first outer shell 51 will now be discussed in more detail. In this illustrated embodiment, the first outer shell 51 is a metallic member that is formed by stamping or pressing a single metal sheet. The first outer shell 51 is constructed of a suitable rigid material that is, for example, an aluminum alloy with an alumite finish or other suitable materials such as, magnesium alloy, titanium alloy, or other light metal. The first outer shell 51 mates with the second outer shell 52 such that the pedal attachment structure 56, the axle supporting structure 60 and the includes a sprocket mounting member 64 are at least each partially disposed in the interior cavity 54 between the first and second outer shells 51 and 52. Alternatively, the first outer shell 51 is made of fiber reinforced resin material such as a carbon fiber-reinforced plastic or polymer (FRP). If the first outer shell 51 is made of fiber reinforced resin material, then the first outer shell 51 can be made by a suitable number of cutting prepreg sheets (e.g., carbon fiber cloth impregnated with resin) into the desired shape, and then using a metal die split to hot-form the prepreg sheets so that the prepreg sheets bend into the shape shown in FIGS. 3 and 4.

As best seen in FIGS. 3 and .4, the first outer shell 51 has a first elongated portion 70 with a first pedal attachment end 72 and a first axle attachment end 74. The first pedal attachment end 72 with a first pedal axle opening 76 and a projecting part 78 in an axial direction with respect to the first pedal axle opening 76. The first elongated portion 70 is provided with a pair of side walls 70a and 70b that mate with the second outer shell 52 to partially define the interior cavity 54. The first pedal attachment end 72 is provided with a curved side wall 72a that connects the side walls 70a and 70b to form a continuous side wall. The first axle attachment end 74 is provided with a plurality of side walls 74a, 74b, 74c and 74d. The side walls 74a to 74d are configured and arranged to mate with the sprocket mounting member 64 to enclose an upper end of the interior cavity 54 that receives the axle supporting structure 60.

In forming the first outer shell 51, a single sheet of metal can be stamped so as to form the first outer shell 51 as a one-piece, pressed sheet metal member in a single stamping or pressing step. In other words, the first elongated portion 70, the first pedal attachment end 72 and the first axle attachment end 74 are simultaneously formed with the projecting part 78 being a bent portion that defines the first pedal axle opening 76, Referring now to FIGS. 2 to 8, the structure of the second outer shell 52 will now be discussed in more detail, in this illustrated embodiment, the second outer shell 52 and the pedal attachment structure 56 are integrated as a single piece such as a forged metal piece. However, a metal stamping process can be used to form the second outer shell 52 and the pedal attachment structure 56 as single piece if needed and/or desired. The second outer shell 52 is constructed of a suitable rigid material that is, for example, an aluminum alloy with an alumite finish or other suitable materials such as, magnesium alloy, titanium alloy, or other light metal.

As best seen in FIGS. 3 and 4, the second outer shell 52 has a second elongated portion 80 with a second pedal attachment end 82 and a second axle attachment end 84. The second pedal attachment end 82 with a second pedal axle opening 86 that is axially aligned with the first pedal axle opening 76. The second outer shell 52 and the pedal attachment structure 56 are integrated as a single piece such as a forged metal piece.

As best seen in FIG. 3, the second elongated portion 80 of the second outer shell 52 is provided with a pair of side walls 80a and 80b. The second pedal attachment end 82 includes the pedal attachment structure 56. The pedal attachment structure 56 connects the side walls 80a and 80b to form a continuous side wall. The side walls 80a and 80b mate with the side walls 70a and 70b of the first outer shell 51 to partially define the interior cavity 54. In this illustrated embodiment, the side walls 80a and 80b are nested within the side walls 70a and 70b of the first outer shell 51, and the pedal attachment structure 56 is disposed inside of the curved side wall 72a of the first pedal attachment end 72. Adhesive is applied between the side walls 70a and 70b and the side walls 80a and 80b to fixedly attach the first and second outer shells 51 and 52 together. The second axle attachment end 84 of the second outer shell 52 is basically a flat ring shaped member with a tab portion. The second axle supporting member 62 integrally formed with the second axle attachment end 84 of the second outer shell 52. Thus, in this illustrated embodiment, the second outer shell 52, the pedal attachment structure 56 and the second axle supporting member 62 are integrally formed as a one-piece member.

Figure 6:
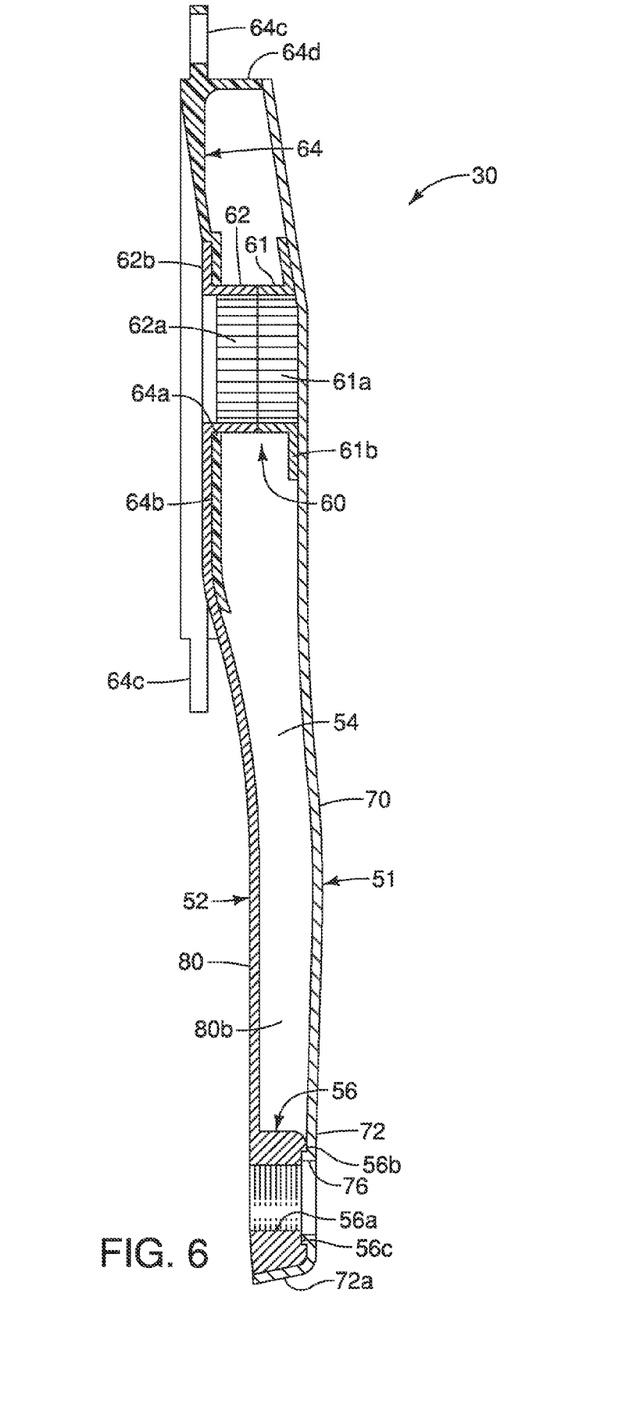
FIG. 6 is a cross-sectional view of the right bicycle crank arm illustrated in FIGS. 1 to 5 as seen along section line 6-6 of FIG. 5.
Figure 7:
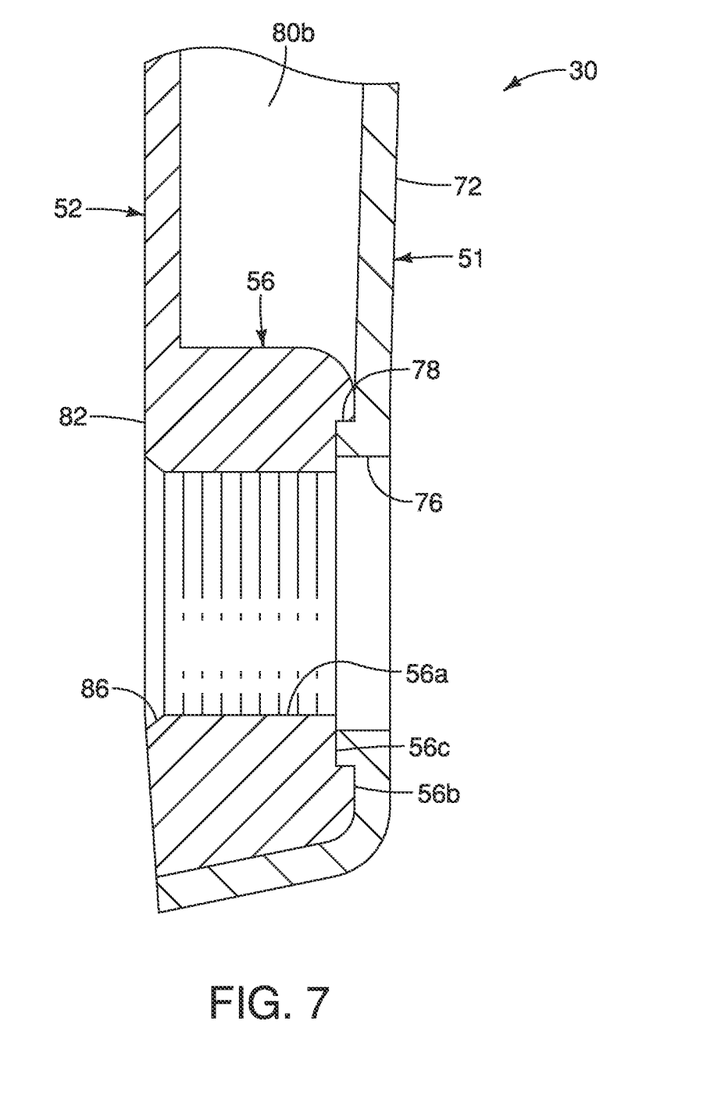
FIG. 7 is an enlarged, cross-sectional view of the pedal attachment end of the right crank arm illustrated in FIGS. 1 to 6 as seen along section line 6-6 of FIG. 5.

Referring mainly to FIGS. 6 and 7, the structure of the pedal attachment structure 56 will now be discussed in more detail. The pedal attachment structure 56 spans the interior cavity 54 between first and second pedal attachment ends 72 and 82 of the first and second outer shells 51 and 52. The pedal attachment structure 56 includes a pedal axle bore 56a axially aligned with the first and second pedal axle openings 76 and 86. The pedal axle (not shown) of one of the pedals 40 is screwed into the pedal axle bore 56a.

The pedal attachment structure 56 further includes an abutment face 56b with a recess 56c formed in the abutment face 56b. The abutment face 56b contacts the first outer shell 51 adjacent the first pedal axle opening 76 with the projecting part 78 of the first outer shell 51 being disposed in the recess 56c of the pedal attachment structure 56. In this illustrated embodiment, the recess 56c of the pedal attachment structure 56 includes a continuous groove that encircles the pedal axle bore 56a, while the projecting part 78 of the first outer shell 51 includes a continuous flange. However, alternatively, other types of mating arrangements can be provided. For example, the projecting part 78 of the first outer shell 51 can be a discontinuous flange made of a plurality of individual projections arranged in a ring pattern, and the recess 56c could be a plurality of individual recesses arranged in a ring pattern around the pedal axle bore 56a such that he individual projections mate with the individual recesses.

Figure 8:
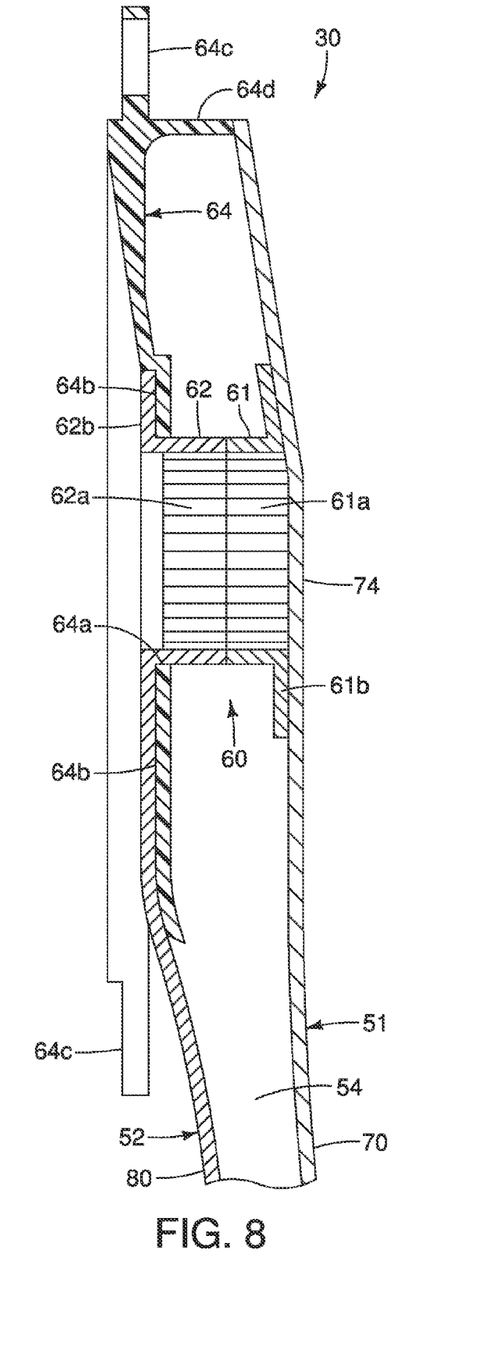
FIG. 8 is an enlarged, cross-sectional view of the crank axle attachment end of the right crank arm illustrated in FIGS. 1 to 6 as seen along section line of FIG. 5.

Referring now to FIGS. 3, 4 and 8, the structure of the axle supporting structure 60 will now be discussed in more detail. The axle supporting structure 60 is constructed of a suitable rigid material that is, for example, an aluminum alloy or other suitable materials. As mentioned above, in this illustrated embodiment, the axle supporting structure 60 is constructed of two separate pieces (e.g. the first and second axle supporting members 61 and 62). The first axle supporting member 61 is disposed at the first axle attachment end 74 of the first outer shell 51. The second axle supporting member 62 is disposed at the second axle attachment end 84 of the second outer shell 52.

In this illustrated embodiment, the first axle supporting member 61 is adhesively attached to the first outer shell 51. The first axle supporting member 61 has a first bore 61a with a first splined inner surface. The first axle supporting member 61 is at least partially disposed in the interior cavity 54 between the first and second outer shells 51 and 52. The first axle supporting member 61 has an attachment flange 61b that is adhesively attached to the first axle attachment end 74 of the first outer shell 51. In this illustrated embodiment, the first axle supporting member 61 is a one-piece, pressed sheet metal member. In this illustrated embodiment, the second axle supporting member 62 is formed as a unitary piece with the second outer shell 52. The second axle supporting member 62 has a second bore 62a with a second splined inner surface that aligns with the first splined inner surface of the first bore 61a. The second axle supporting member 62 is at least partially disposed in the interior cavity 54 between the first and second outer shells 51 and 52. The first splines 34a of the first end portion of the crank axle 34 are loose-fitted with and by an adhesive fixed to the inner splines of the axle supporting structure 60 of the right crank arm 30. Specifically, the first splines 34a of the first end portion of the crank axle 34 are loose-fitted with and by an adhesive fixed to the first and second splined inner surfaces 61a and 62a of the first and second axle supporting members 61 and 62. In this case, because the first splines 34a of the first end portion of the crank axle 34 has a slightly smaller diameter than the inside diameter of the first and second splined inner surfaces 61a and 62a of the first and second axle supporting members 61 and 62, it is possible to avoid undesirable deformation which could occur when the crank axle 34 is inserted into the axle supporting structure 60. Alternatively, the first splines 34a of the first end portion of the crank axle 34 can be press-fitted with the first and second splined inner surfaces 61a and 62a of the first and second axle supporting members 61 and 62. In this case, the first splines 34a of the first end portion of the crank axle 34 has a slightly larger diameter than the inside diameter of the first and second splined inner surfaces 61a and 62a of the first and second bores 61a and 62a to form a press fit connection therebetween.

Referring now to FIGS. 3, 4 and 6, the structure of the sprocket mounting member 64 will now be discussed in more detail. In this illustrated embodiment, the sprocket mounting member 64 is adhesively attached to both the first and second outer shells 51 and 52. In the illustrated embodiment, the adhesive can be any suitable adhesive such as an epoxy adhesive. In the illustrated embodiment, the sprocket mounting member 64 is made of fiber reinforced resin material such as a carbon fiber-reinforced plastic or polymer (FRP). The sprocket mounting member 64 can be made by a suitable number of cutting prepreg sheets (e.g., carbon fiber cloth impregnated with resin) into the desired shape, and then using a metal die split to hot-form the prepreg sheets so that the prepreg sheets bend into the shape shown in FIGS. 3 and 4. Alternatively, the sprocket mounting member 64 can also be made of a suitable metallic material such as an aluminum alloy.

The sprocket mounting member 64 functions as a spider arm of the crank arm 30. The sprocket mounting member 64 is attached to at least one of the first and second outer shells 51 and 52. The crank axle 34 passes through a center aperture 64a of the sprocket mounting member 64. The center aperture 64a of the sprocket mounting member 64 is larger than the maximum diameter of the crank axle 34. In fact, the tubular portion of the second axle supporting member 62 passes through the center aperture 64a of the sprocket mounting member 64 with the crank axle 34 fixed to the second splined inner surface of the second bore 62a formed in the tubular portion of the second axle supporting member 62 by adhesive and/or a press fit. The sprocket mounting member 64 has a recess 64b that extends from the center aperture 64a of the sprocket mounting member 64 to a peripheral edge thereof The recess 64b of the sprocket mounting member 64 receives the second axle attachment end 84 of the second outer shell 52. Thus, the contact surface of the recess 64b of the sprocket mounting member 64 and the contact surface of the second axle attachment end 84 of the second outer shell 52 provides for a large attachment interface for adhesively securing the sprocket mounting member 64 to the second outer shell 52.

As shown in FIGS. 3 and 4, the sprocket mounting member 64 is a substantially starfish-shaped member that has five radially extending arm parts 64c with respect tot the center aperture 64a. Sprocket attachment holes formed at the distal ends of the arm parts 64c for fastening the chainrings 38. Chainring fasteners are inserted through the attachment holes of the arm parts 64c to fasten the chainrings 38 by conventional methods. Each of the arm parts 64c also has a tab 64d that mates with the side walls 74a, 74b, 74c and 74d of the first axle attachment end 74 for closes the space between the first outer shell 51 and the sprocket mounting member 64.

Figure 9:
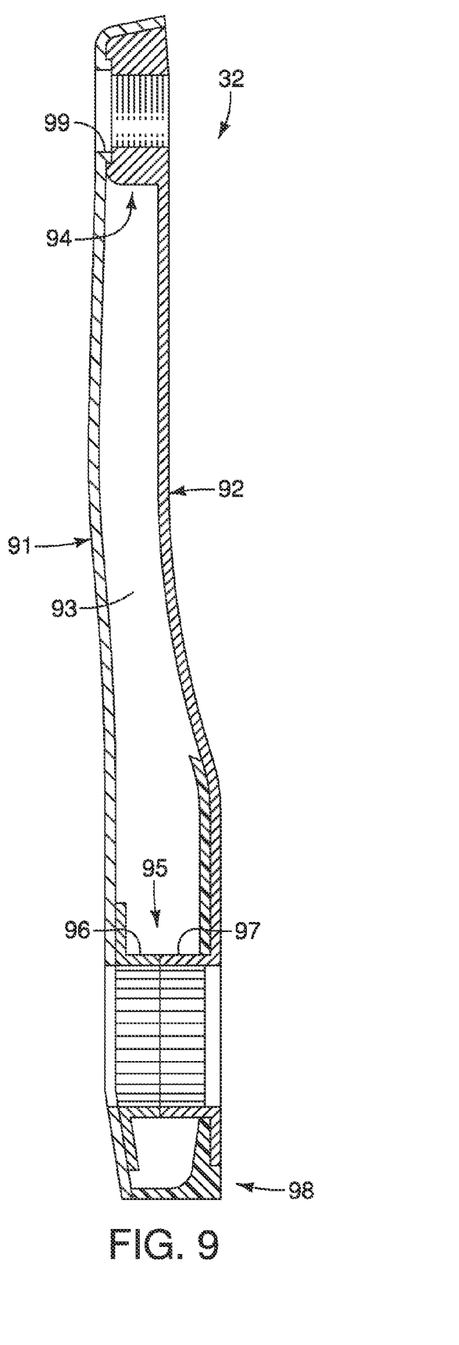
FIG. 9 is a cross-sectional view of the left bicycle crank arm illustrated in FIGS. 1 to 4 as seen along section similar to the cross section of the right bicycle crank arm illustrated in FIG. 5.

Referring now to FIG. 9, the structure of the left crank arm 32 will now be discussed in more detail. The left crank arm 32., in this illustrated embodiment, basically includes a first outer shell 91 and a second outer shell 92. The first and second outer shells 91 and 92 are fixedly secured together to at least partially define an interior cavity 93, which can be empty or filled with a lightweight material (e.g., foam). In this illustrated embodiment, the first and second outer shells 91 and 92 are adhesively attached together to form the interior cavity 93 therebetween. In the illustrated embodiment, the adhesive can be any suitable adhesive. For example, an epoxy type adhesive can be used to fix the first and second outer shells 91 and 92 together. Similar to the right crank arm 30, the left crank arm 32 further includes a pedal attachment structure 94 and an axle supporting structure 95. The pedal attachment structure 94 is configured and arranged for securing one of the pedals 40 thereto. The axle supporting structure 95 is disposed in an interior cavity 93 between the first and second outer shells 91 and 92. The axle supporting structure 95 is configured and arranged for attaching the crank axle 34 to the left crank arm 32. The crank axle 34 is releasably attached to the crank arm 30 by the axle bolt 59 as seen in FIG. 2. In this illustrated embodiment, the axle supporting structure 91 includes a first axle supporting member 96 and a second axle supporting member 97. The first axle supporting member 96 is adhesively attached to the first outer shell 91. The second axle supporting member 97 is adhesively attached to the second outer shell 92.

In this illustrated embodiment, the left crank arm 32 further includes a reinforcement member 98. In this illustrated embodiment, the reinforcement member 98 is adhesively attached to the first and second outer shells 91 and 92. In the illustrated embodiment, the adhesive can be any suitable adhesive.

The left crank arm 32 basically has the same configuration as the right crank arm 30, but for the elimination of the structure for mounting chainrings in the first outer shell 91 and the reinforcement member 98, and the addition of a hole in the first outer shell 91, the reinforcement member 98. In view of the similarities between the crank arms 30 and 32, the left crank arm 32 will not be discussed or illustrated in detail herein.

Figure 10:
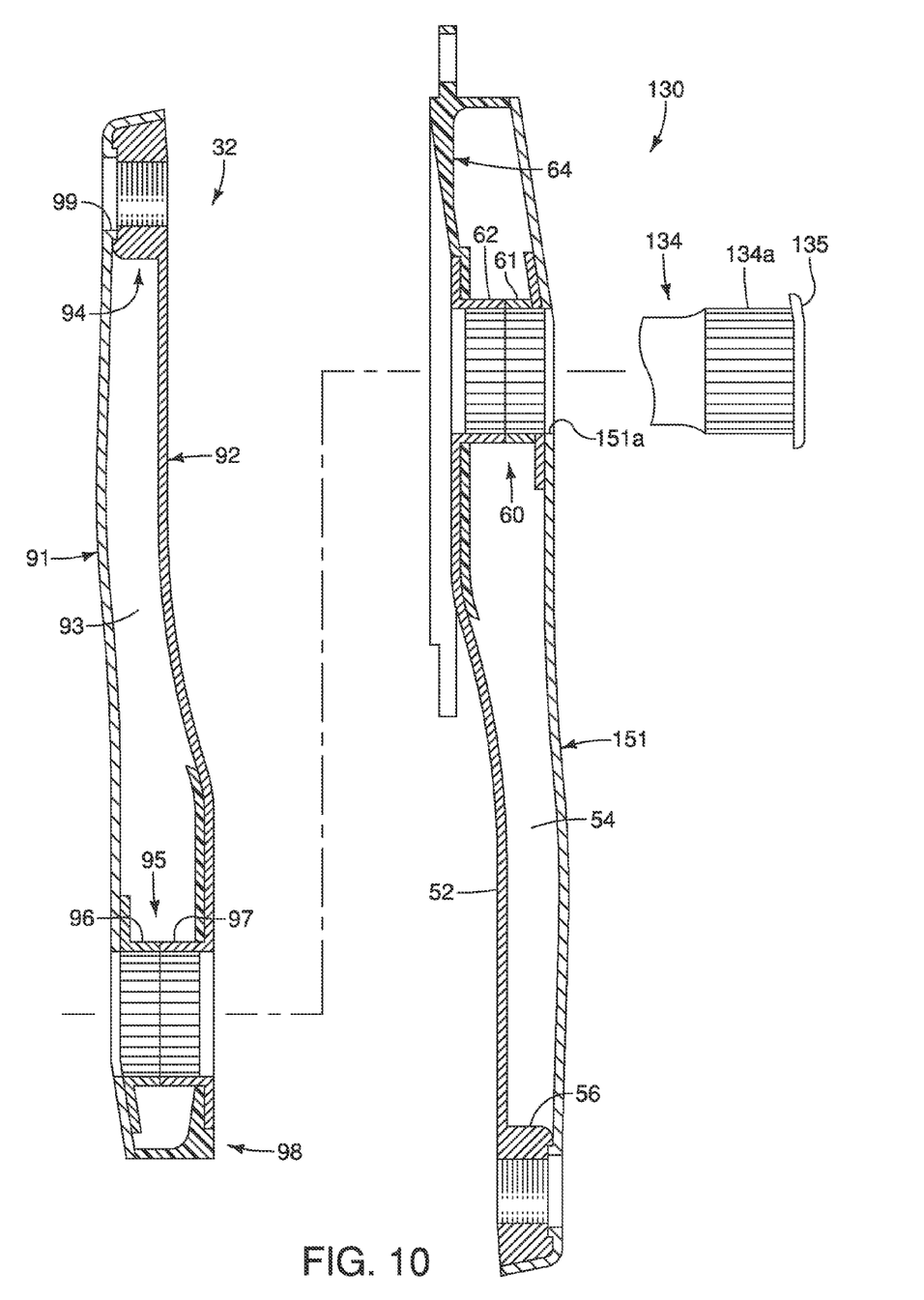
FIG. 10 is a transverse cross sectional view of the bicycle crank assembly in accordance with another illustrated embodiment.

Turning now to FIG. 10, a bicycle crank assembly is illustrated in accordance with another illustrated embodiment. Here, a modified right crank arm 130 is attached to a modified crank axle 134. The only difference between the right crank arm 30 of the prior embodiment and the right crank arm 130 is that the right crank arm 130 has a modified outer shell 151. The outer shell 151 only differs from the outer shell 51 in that a hole 151a has been added to outer shell 151 so that the crank axle 134 can be inserted from the outer facing side of the right crank arm 130. The crank. axle 134 is identical to the crank axle 34, except that a right end 134a of the crank axle 134 has been provided with an abutment flange 135 to limit movement of the crank axle 134 into the hole 151a. of the right crank arm 130 and to effectively prevent the crank arm 130 from further moving axially outwardly on the crank axle 134 during pedaling. In view of the similarities between the crank arms 30 and 130, the crank arm 130 will not be discussed or illustrated in detail herein.

In this second illustrated embodiment, the first splines 134a of the first end portion of the crank axle 134 are loosely mounted in a radial direction of the crank axle 134 to the axle supporting structure 60 of the right crank arm 130. Specifically, the first splines 134a of the first end portion of the crank axle 134 are loosely mounted in a radial direction of the crank axle 134 to the first and second splined inner surfaces 61a and 62a of the first and second axle supporting members 61 and 62. The first splines 134a of the first end portion of the crank axle 134 are then adhesively attached to the first and second splined inner surfaces of the first and second bores 61a and 62a of the first and second axle supporting members 61 and 62. Thus, the axle supporting structure 60 of the right crank arm 130 is adhesively attached to the first splines 134a of the first end portion of the crank axle 134. In this case, because the first splines 134a of the first end portion of the crank axle 134 has a slightly smaller diameter than the inside diameter of the first and second splined inner surfaces 61a and 62a of the first and second axle supporting members 61 and 62, it is possible to avoid undesirable deformation which could occur when the crank axle 134 is inserted into the axle supporting structure 60. Alternatively, the first splines 134a of the first end portion of the crank axle 134 can be (press-fitted with the first and second splined. inner surfaces 61a and 62a of the first and second axle supporting members 61 and 62. In this case, the first splines 134a of the first end portion of the crank axle 34 has a slightly larger diameter than the inside diameter of the first and second splined inner surfaces 61a and 62a of the first and second axle supporting members 61 and 62 to form a press fit connection therebetween.

Figure 11:
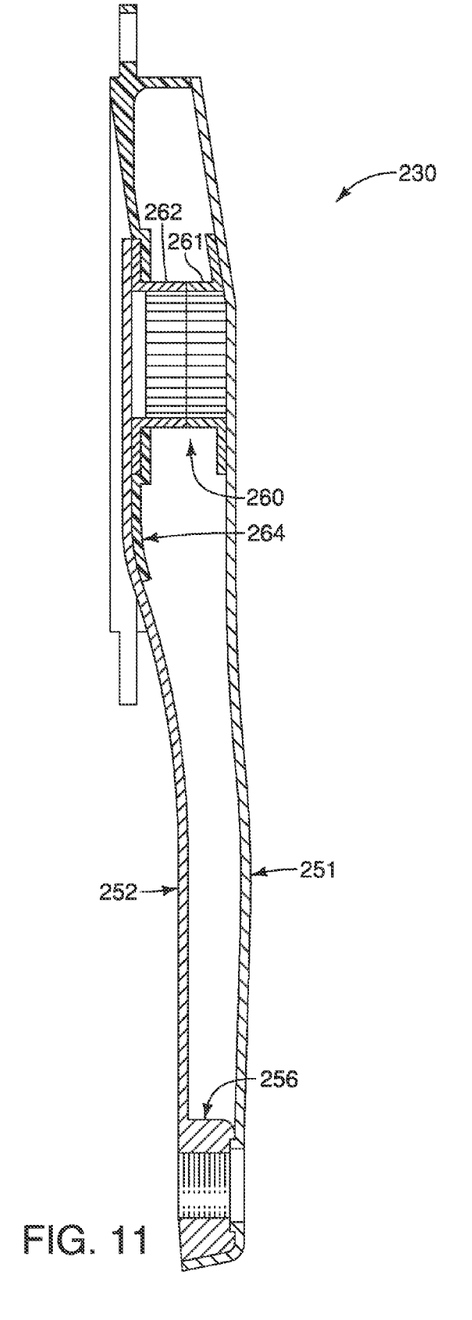
FIG. 11 is a transverse cross sectional view of the bicycle crank arm in accordance with another illustrated embodiment.

Turning now to FIG. 11, a modified right crank am 230 is illustrated in accordance with another illustrated embodiment. The right crank am 230 basically includes a first outer shell 251 and a second outer shell 252. In this illustrated embodiment, the right crank arm 230 further includes a pedal attachment structure 256 and an axle supporting structure 260. The axle supporting structure 260 includes a first axle supporting member 261 and a second axle supporting member 262. In addition, the right crank arm 230 further includes a sprocket mounting member 264.

The only difference between the right crank arm 30 of the first embodiment and the right crank arm 230 is that the second axle supporting member 262 is adhesively attached to the second outer shell 252, instead of being an integrated part of the second outer shell 252. Thus, the second outer shell 252 and the sprocket mounting member 264 have been modified to accommodate the second axle supporting member 262 being a separate element. In view of the similarities between the crank arms 30 and 230, the crank arm 230 will not be discussed or illustrated in detail herein. While the first axle supporting member 261 is a separate member from the second axle supporting member 262 in this illustrated embodiment, the first and second axle supporting members 261 and 262 can also be a unitary member as long as the first and second axle supporting members 261 and 262 are attached to the first and second shells 251 and 252 respectively.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "attached" or "attaching", as used herein, encompass configurations in which an element is directly secured to another element by affixing the element directly to the other element; configurations in which an element is indirectly secured to another element by affixing the element to intermediate member(s) which in turn are affixed to the other element; and configurations in which one element is integral with another element, i.e. one element is essentially part of the other element. This definition also applies to words of similar meaning, for example the terms "joined" and "fixed" and their derivatives. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from he scope of the invention as defined in the appended claims. For example, the size, shape, location or orientation of the various components can be changed as needed and/or desired. Components that are shown directly connected or contacting each other can have intermediate structures disposed between them, unless specifically requiring direct contact. Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
    a crank arm including
        a first outer shell having a first pedal attachment end with a first pedal axle opening and a projecting part projecting from the first outer shell in an axial direction with respect to the first pedal axle opening, the first outer shell being a one-piece, pressed sheet metal member with the projecting part being a bent portion that defines the first pedal axle opening,
        a second outer shell having a second pedal attachment end with a second pedal axle opening that is axially aligned with the first pedal axle opening, the first and second outer shells being adhesively attached together to firm an interior cavity therebetween, and
        a pedal attachment structure spanning the interior cavity between the first and second pedal attachment ends of the first and second outer shells, the pedal attachment structure and the second outer shell being integrated as a single piece of forged metal, the pedal attachment structure including a pedal axle bore axially aligned with the first and second pedal axle openings, the pedal attachment structure further including an abutment face with a recess formed in the abutment face, the abutment face contacting the first outer shell adjacent the first pedal axle opening, and the projecting part of the first outer shell being disposed in the recess of the pedal attachment structure.

2. The bicycle crank assembly according to claim 1, wherein
    the recess of the pedal attachment structure includes a continuous groove that encircles the pedal axle bore, and
    the projecting part of the first outer shell includes a continuous flange.

3. The bicycle crank assembly according to claim 1, wherein
    the crank arm further includes an axle supporting structure disposed in the interior cavity between the first and second outer shells.

4. The bicycle crank assembly according to claim 3, further comprising
    an axle attached to the axle supporting structure of the crank arm, the axle including a plurality of first splines disposed at a first end portion of the axle, and a plurality of second splines disposed at a second end portion of the axle.

5. The bicycle crank assembly according to claim 4, wherein
    the first splines of the first end portion of the axle are press-fitted with the axle supporting structure of the crank arm.

6. The bicycle crank assembly according to claim 4, wherein
    the first splines of the first end portion of the axle are mounted in a radial direction of the axle to the axle supporting structure of the crank arm, a diameter of the first splines of the first end portion being smaller than an inside diameter of the axle supporting structure.

7. The bicycle crank. assembly according to claim 4, wherein
    the axle supporting structure of the crank arm is adhesively attached to the first splines of the first end portion of the axle.

8. The bicycle crank assembly according to claim 3, wherein
    the axle supporting structure includes a first axle supporting member that is attached to the first outer shell, and a second axle supporting member that is attached to the second outer shell.

9. The bicycle crank assembly according to claim 8, wherein
    the first axle supporting member is a one-piece, pressed sheet metal member, and the second axle supporting member, the second outer shell and the pedal attachment structure are integrated as a single piece of forged metal.

10. The bicycle crank assembly according to claim 1, wherein
the crank arm further includes a sprocket mounting member adhesively attached to the first and second outer shells.

11. The bicycle crank assembly according to claim 10, wherein
the sprocket mounting member is made of a fiber reinforced resin material.

12. The bicycle crank. assembly according to claim 1, wherein
the first outer shell has a pair of first and second sidewalls that mate with the second outer shell to partially define the interior cavity.

13. The bicycle crank assembly according to claim 12, wherein
the first pedal attachment end of the first outer shell has a curved side wall that connects the first and second sidewalls to form a continuous side wall.

14. A bicycle crank assembly comprising:
a crank arm including
a first outer shell having a pair of first and second sidewalls and a first pedal attachment end with a first pedal axle opening and a projecting part projecting from the first outer shell in an axial direction with respect to the first pedal axle opening, the first pedal attachment end having a curved sidewall connecting the first and second sidewalls to form a continuous sidewall, the continuous sidewall extending in the axial direction further than the projecting part such that the projecting part is axially recessed relative to the first sidewall, the second sidewall, and the curved sidewall, the first outer shell being a one-piece, pressed sheet metal member with the projecting part being a bent portion that defines the first pedal axle opening,
a second outer shell having a second pedal attachment end with a second pedal axle opening that is axially aligned with the first pedal axle opening, the first and second outer shells being adhesively attached together to form an interior cavity therebetween, the second shell mating with the first and second sidewalls of the first outer shell to partially define the interior cavity, and
a pedal attachment structure spanning the interior cavity between the first and second pedal attachment ends of the first and second outer shells, the pedal attachment structure including a pedal axle bore axially aligned with the first and second pedal axle openings, the pedal attachment structure further including an abutment face with a recess formed in the abutment face, the abutment face contacting the first outer shell adjacent the first pedal axle opening, and the projecting part of the firs outer shell being disposed in the recess of the pedal attachment structure.

* * * * *